US006182818B1

(12) United States Patent
Kuchta et al.

(10) Patent No.: US 6,182,818 B1
(45) Date of Patent: Feb. 6, 2001

(54) CONVEYORIZED APPARATUS FOR PERFORMING WORK OPERATIONS ON ONE OR MORE LAYERS OF SHEET-TYPE WORK MATERIAL

(75) Inventors: Richard Kuchta, Shickshinny, PA (US); Peter Hasiuk, Enfield, CT (US)

(73) Assignee: Gerber Technology, Inc., Tolland, CT (US)

( * ) Notice: Under 35 U.S.C. 154(b), the term of this patent shall be extended for 0 days.

(21) Appl. No.: 09/115,711

(22) Filed: Jul. 15, 1998

(51) Int. Cl.[7] ............ B65G 25/00

(52) U.S. Cl. ............ 198/750.1

(58) Field of Search ............ 198/341.08, 750.1, 198/841, 850; 83/353, 356.2, 356, 355, 403.1, 427, 429, 435.2, 734

(56) References Cited

U.S. PATENT DOCUMENTS

| | | | | |
|---|---|---|---|---|
| 705,474 | * | 7/1902 | St. James | 198/841 |
| 796,947 | * | 8/1905 | Thomas | 198/850 |
| 1,723,357 | * | 8/1929 | Koopman | 198/850 |
| 3,194,102 | * | 7/1965 | Jarnagin | 83/428 |
| 4,995,287 | * | 2/1991 | Nasu | 83/428 |
| 5,412,836 | | 5/1995 | Kuchta . | |

FOREIGN PATENT DOCUMENTS

| | | |
|---|---|---|
| 1 563 505 | 3/1980 | (GB) . |
| 2 179 906 | 3/1987 | (GB) . |

* cited by examiner

*Primary Examiner*—Jospeh E. Valenza
(74) *Attorney, Agent, or Firm*—McCormick, Paulding & Huber LLP

(57) ABSTRACT

A conveyorized apparatus for performing work operations on one or more layers of sheet-type work material includes a frame having at least three flexible drive members coupled thereto for movement in a direction longitudinal of the frame. A plurality of slats are also provided, each extending transversely across the frame and positioned consecutively relative to one another. Each slat defines an upper surface, and a lower surface attached for movement to the flexible drive members. The upper surfaces of the plurality of slats, collectively define a supported adapted to carry the layers of work material thereon, during the performance of the work operations. The flexible advancing members and the slats are driven by a suitable drive, such as a motor.

10 Claims, 1 Drawing Sheet

CONVEYORIZED APPARATUS FOR PERFORMING WORK OPERATIONS ON ONE OR MORE LAYERS OF SHEET-TYPE WORK MATERIAL

FIELD OF THE INVENTION

The present invention is related generally to an apparatus for performing work operations on one or more layers of sheet-type work material, and is more specifically directed to an apparatus whereby the work material is supported on a conveyor defined in-part by a plurality of consecutively oriented movable slats coupled to, and driven by at least three flexible drive members.

BACKGROUND OF THE INVENTION

The present invention has particular utility in the manufacture of garment pattern pieces and will be described herein as directed to such use. Generally, garment pattern pieces are fabricated by positioning one or more layers of sheet-type work material on a cutter table. A cutting head movably mounted on the cutter table traverses the length and width of the work material cutting the pattern pieces from the layers, in response to commands issued from a controller. The support surface upon which the work material is positioned is usually a conveyor comprised in-part by a plurality of slats positioned consecutively in a side-by-side relationship relative to one another, longitudinally of the cutter table. Collectively, the slats form a support surface for carrying the work material during the performance of a work operation.

In prior art cutter tables, each slat is usually coupled to a conveyor drive mechanism that includes a pair of chains, spaced apart relative to one another and extending longitudinally along the cutter table. Generally, the chains are driven by rotatable sprockets mounted to the cutter table at opposite ends thereof. Since the cutter tables are as wide as possible to accommodate large fabric widths, the slats have a tendency to sag between the chains. This causes the surface upon which the work material is supported to be cambered rather than flat which has the potential to cause the production of inaccurately cut pattern pieces.

Upon completion of a cutting operation, the work material is generally conveyed from the cutter table to what is referred to by those skilled in the pertinent art as a "take-off table." To accommodate the transition from the cutter table to the take-off table, a ramped surface composed of a number of finger-like extensions projects from, and across the take-off table onto the cutter table. A problem associated with large portions of the slats being unsupported, is that the slats have a tendency to be overly flexible and to "bounce" causing gaps to open and close between the ramped surface and the slats. This can result in the work material being misfed into the gaps rather than onto the take-off table, thereby damaging the cut pattern pieces.

Another problem associated with the above-described unsupported slat spans, is that as the slats move along the cutter table, they can pile on top of one another, a phenomena referred to as "shingling." When this occurs, the integrity of the cutting operation can be compromised, and the operation of the cutter table must be interrupted adding to the time and expense associated with producing the pattern pieces.

Based on the foregoing, it is the general object of the present invention to provide a conveyorized cutter table that overcomes the above-described drawbacks of prior art cutter tables.

It is a more specific object of the present invention to provide increasingly wide conveyorized cutter tables, wherein the slats and thereby the work material are adequately driven and supported during the performance of a work operation, without the sagging or shingling problems associated with prior art cutter tables.

SUMMARY OF THE INVENTION

The present invention is directed to a conveyorized cutter table for performing work operations on one or more layers of sheet-type work material that includes a frame, and at least three flexible advancing members coupled to the frame for movement in a direction longitudinally thereof. The flexible advancing members are approximately parallel, and spaced apart relative to one another.

A plurality of elongated slats are consecutively positioned relative to one another and extend transversely across the frame. Each slat defining a first upper surface, and a second lower surface coupled to each of the flexible drive members. The first upper surfaces of the slats collectively define a support surface adapted to carry the work material during the performance of a work operation. Drive means are provided for selectively moving the flexible advancing members, and thereby the slats coupled thereto in a direction longitudinal of the frame, in response to commands issued from a controller.

In a preferred embodiment, the flexible drive members comprise at least three chains, preferably a matched set, coupled to at least two approximately parallel, spaced-apart shafts extending transversely across and rotatably coupled to the frame at opposite ends thereof. At least one of the shafts is coupled to the drive means, such that during operation the drive means selectively causes the shaft to rotate thereby moving the chains and the slats attached thereto, in a direction longitudinal of the frame in response to commands issued from the controller. Preferably, each of the shafts are rotatably coupled to at least three bearings that in turn are mounted to the frame.

At least six sprockets are also provided, three of which are coupled to each shaft, adjacent to each of the bearings for engaging and driving the chains. In addition, at least three advancing member guides are mounted on, and extend longitudinally along the frame, each being positioned, adjacent at one end, to one of the sprockets mounted on one of the shafts; and at an opposing end, to a corresponding sprocket mounted on the other of the shafts. Preferably, each of the advancing member guides defines an upper surface for supporting the slats, thereby preventing the slats from sagging or shingling as they are advanced.

DETAILED DESCRIPTION OF THE PREFERRED EMBODIMENT

Figure 1:
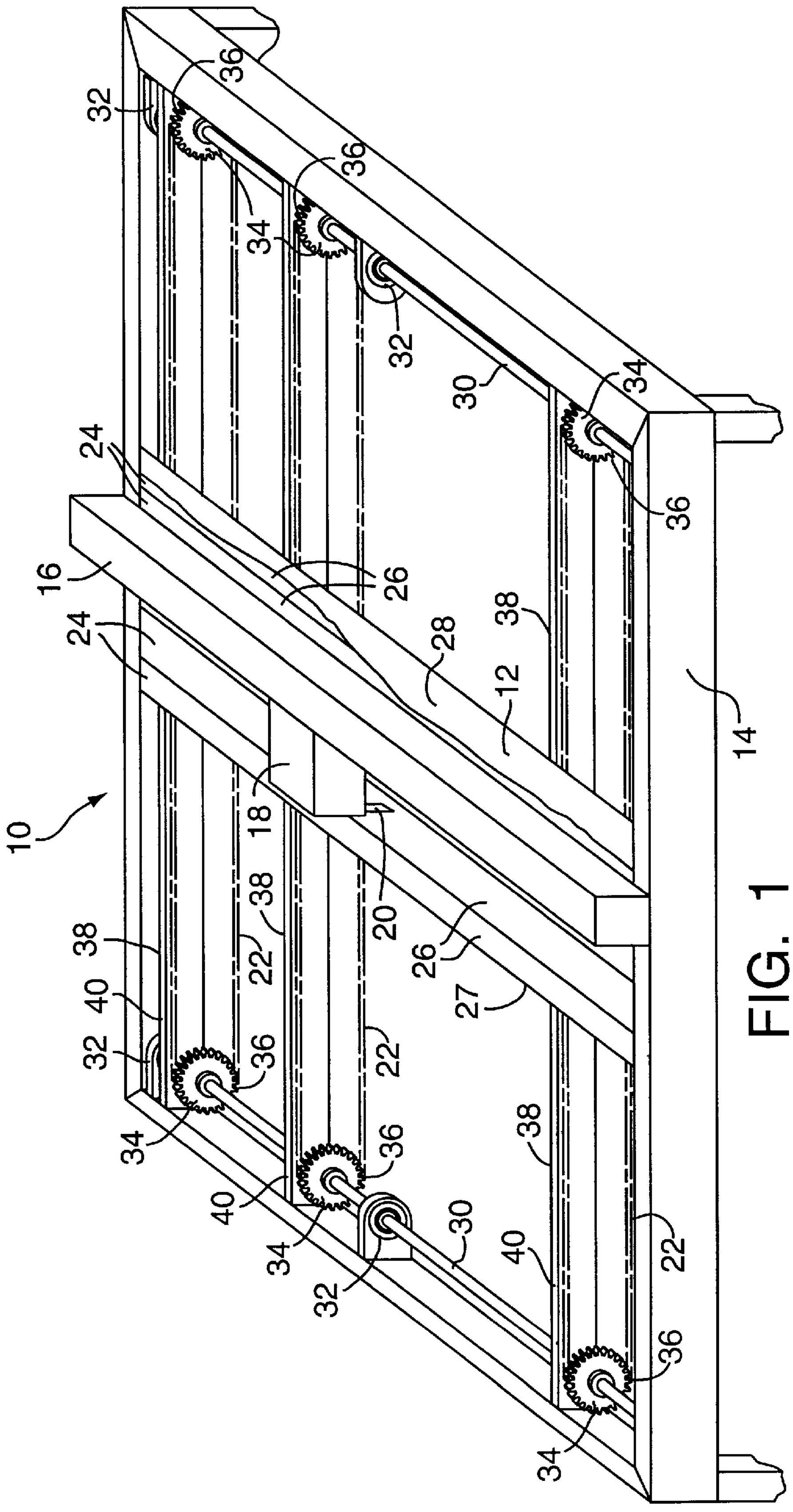
FIG. 1, is a partial perspective view of a cutter table embodying the apparatus of the present invention showing a conveyer comprised in-part by a plurality of consecutive slats; the conveyor being cut away to reveal three flexible drive members for moving the slats in a direction longitudinal of the cutter table.

A conveyorized apparatus shown in FIG. 1 as a cutter table 10, is adapted to perform work operations on one or more layers of sheet-type work material 12. The cutter table 10 includes a frame 14 having an elongated support 16 mounted thereon. The support 16 extends laterally across the frame 14 for movement back-and-forth longitudinally thereof in response to commands issued from a controller having machine readable cutting data stored therein. A cutter head 18 having a cutting implement 20 attached thereto is mounted to the support 16 for movement back-and-forth along the support in response to commands issued from the controller.

Three flexible advancing members 22 are also coupled to the frame 14 and spaced-apart relative to one another for movement in a direction longitudinal of the frame 14. A suitable drive, such as a motor (not shown) is also provided for driving the chains 22, in the direction longitudinal of the frame 14. Preferably, the chains 22 are a matched set of approximately equal length. While the flexible advancing members 22 have been described as being chains, the present invention is not limited in this regard as other types of advancing members such as cog belts, or cables, can be substituted without departing from the broader aspects of the present invention.

A plurality of slats 24 are positioned consecutively relative to one another, longitudinally of the frame 14, with each slat defining a first upper surface 26, and a second lower surface 27 coupled to each of the flexible advancing members 22. The first upper surfaces 26 of the slats 24, collectively define a support surface 28 for carrying one or more layers of work material 12. During the performance of a work operation, the motion of the chains 22 causes the slats 24 and any work material supported thereon, to move longitudinally of the frame 14, in response to commands issued from the controller.

Still referring to FIG. 1, two elongated shafts 30 are each rotatably coupled to three roller-type bearings 32 (only two bearings shown per shaft), that in turn are mounted on the frame 14. The shafts 30 are approximately parallel to each other and extend transversely across, and are positioned at opposite ends of the frame 14, with the bearings 32 being spaced approximately equally apart from one another along each shaft. One of the shafts 30 is coupled to the motor and can be selectively rotated thereby in response to commands issued from the controller. Three sprockets 34 are also mounted on each shaft 30 with each of the sprockets being positioned adjacent to one of the bearings 32, and defining a plurality of outwardly projecting teeth 66. Each of the chains 22 drivingly engages the teeth 36 of one of the sprockets 34 mounted on one of the shafts 30, and the teeth of a corresponding sprocket mounted on the other shaft. Accordingly, the chains 22 extend between the shafts 30.

Three advancing member guides 38 are mounted to the frame 14 and extend longitudinally thereof. Each advancing member guide 38 is located adjacent to one of the chains 22, and spans the distance between the shafts 30 to direct the motion of the chains during operation. In addition, each of the advancing member guides 38 defines an upper surface 40 that is positioned to support the slats 24 during the performance of a work operation.

In operation, one or more layers of work material 12 are positioned on the support 28 defined collectively by the first upper surfaces 26 of the slats 24. The motor, is selectively energized in response to commands issued from the controller, which in turn causes the shaft 30, to which the motor is coupled, to rotate. The rotation of the shaft 30 drives the three chains 22, and the slats 24 attached thereto, in a direction longitudinal of the frame thereby moving the work material supported by the slats, back-and-forth while the cutter head 18 and the support 16 move the cutting implement 20 along the work material 12, thereby performing cutting operations on the work material according to the machine readable cutting data stored in the controller.

While preferred embodiments have been shown and described, various modifications and substitutions may be made without departing from the spirit and scope of the present invention. Accordingly, it is to be understood that the present invention has been described by way of example, and not by limitation.

What is claimed is:

1. A conveyorized apparatus for performing work operations on one or more layers of sheet-type work material, comprising:

a frame;

at least three flexible advancing members coupled to said frame for movement in a direction longitudinal thereof, said advancing members being approximately parallel and spaced-apart relative to one another;

at least three advancing member guides, each coupled to said frame adjacent to one of said flexible advancing members for directing the movement of said advancing members during the performance of a work operation;

a plurality of elongated slats extending transversely across said frame and positioned consecutively relative to one another, longitudinally of said frame, each slat defining a first upper surface, and a second lower surface coupled to each of said flexible advancing members, the first upper surfaces of the slats collectively defining a support surface for carrying one or more layers of work material;

a controller associated with said apparatus, having machine readable data stored therein for controlling work operations performed on said work material; and drive means for selectively moving said flexible advancing members and said plurality of slats in a direction longitudinal of said frame, in response to commands issued from said controller.

2. A conveyorized apparatus as defined by claim 1, wherein said at least three flexible advancing members comprise at least three chains.

3. A conveyorized apparatus as defined by claim 2, wherein said at least three chains are matched.

4. A conveyorized apparatus as defined by claim 1, wherein said at least three flexible advancing members comprise at least three belts.

5. A conveyorized apparatus as defined by claim 1, wherein said at least three flexible advancing members comprise at least three cables.

6. A conveyorized apparatus as defined by claim 1, further comprising:

at least two shafts rotatably coupled to the frame extending transversely thereacross, said shafts being approximately parallel to one anther and positioned at opposite ends of the frame;

each of said flexible advancing members being operably connected to said shafts; and wherein at least one of said shafts is coupled to said drive means for moving said flexible advancing members and said plurality of slats coupled thereto, in a direction longitudinal of said frame, in response to commands issued from said controller.

7. A conveyorized apparatus as defined by claim 6, further comprising at least three sprockets coupled to each shaft, each of said sprockets defining a plurality of outwardly projecting teeth for drivingly engaging and moving said chains in a direction longitudinal of said frame in response to commands issued from said controller.

8. A conveyorized apparatus as defined by claim 6, further comprising at least three bearings coupled to said frame and rotatably coupled to each shaft.

9. A conveyorized apparatus as defined by claim 1, wherein each of said advancing member guides defines an upper surface for supporting said plurality of slats.

10. A conveyorized apparatus as defined by claim 6 wherein said drive means includes a motor coupled to at least one of said shafts, said motor being responsive to commands issued from said controller.

* * * * *